(12) United States Patent
Kawamura et al.

(10) Patent No.: US 8,944,307 B2
(45) Date of Patent: Feb. 3, 2015

(54) METHOD OF WELDING METHOD, WELDING METHOD AND WELDED JOINT BODY

(75) Inventors: Yoshihito Kawamura, Kumamoto (JP); Jonghyun Kim, Kumamoto (JP); Hironori Kuroki, Fukuoaka (JP); Yuji Yanagida, Fukuoka (JP); Naohisa Sawai, Fukuoka (JP); Masafumi Miyajima, Saitama (JP)

(73) Assignees: National University Corporation Kumamoto University, Kumamoto (JP); Kuroki Kogosyo Co., Ltd., Fukuoka (JP)

( * ) Notice: Subject to any disclaimer, the term of this patent is extended or adjusted under 35 U.S.C. 154(b) by 573 days.

(21) Appl. No.: 13/257,712

(22) PCT Filed: Mar. 18, 2010

(86) PCT No.: PCT/JP2010/055304
§ 371 (c)(1),
(2), (4) Date: Dec. 5, 2011

(87) PCT Pub. No.: WO2010/110405
PCT Pub. Date: Sep. 30, 2010

(65) Prior Publication Data
US 2012/0094141 A1 Apr. 19, 2012

(30) Foreign Application Priority Data
Mar. 25, 2009 (JP) ................... 2009-074903

(51) Int. Cl.
*B23K 31/02* (2006.01)
*B23K 15/00* (2006.01)
*B23K 26/32* (2014.01)

(52) U.S. Cl.
CPC ......... *B23K 15/0093* (2013.01); *B23K 26/3206* (2013.01); *B23K 26/3233* (2013.01)
USPC ...................... 228/101; 228/122.1; 228/233.2

(58) Field of Classification Search
None
See application file for complete search history.

(56) References Cited

U.S. PATENT DOCUMENTS

| 4,857,414 A | 8/1989 | Araki et al. |
| 4,906,306 A | 3/1990 | Araki et al. |

(Continued)

FOREIGN PATENT DOCUMENTS

| EP | 2 174 743 | 4/2010 |
| JP | 60-203379 | 10/1985 |

(Continued)

OTHER PUBLICATIONS

Machine Translation, Kuroki et al., JP 2006-088201 A, Apr. 2006.*

(Continued)

*Primary Examiner* — Kiley Stoner
(74) *Attorney, Agent, or Firm* — Wenderoth, Lind & Ponack, LLP

(57) ABSTRACT

A welding method of applying energy to an interface where a metal glass and a crystalline metal make contact with each other or to the metal glass near the interface, heating and melting the metal glass to form a molten layer, and joining the metal glass and the crystalline metal. The metal glass has a glass formation ability in which a nose time of a TTT curve when a solid of the metal glass is reheated is 0.2 seconds or more. The metal glass and the crystalline metal are formed with a material that satisfies a temperature range of a temperature of the metal glass at which a spread factor of the crystalline metal that has not been melted and the molten metal glass is 25% or more and a melting point of the crystalline metal to be 100 K or more.

6 Claims, 13 Drawing Sheets

(56) References Cited

U.S. PATENT DOCUMENTS

| | | | |
|---|---|---|---|
| 8,404,992 B2 * | 3/2013 | Kawamura et al. | 219/121.14 |
| 2007/0023489 A1 * | 2/2007 | Swiston et al. | 228/262.9 |
| 2010/0275655 A1 * | 11/2010 | Kawamura et al. | 65/59.1 |

FOREIGN PATENT DOCUMENTS

| | | |
|---|---|---|
| JP | 63-262237 | 10/1988 |
| JP | 64-8219 | 1/1989 |
| JP | 11-33746 | 2/1999 |
| JP | 2002-283060 | 10/2002 |
| JP | 2004-66294 | 3/2004 |
| JP | 2005-246433 | 9/2005 |
| JP | 2006-88201 | 4/2006 |
| JP | 2008-214704 | 9/2008 |
| JP | 2009-078292 A * | 4/2009 |
| WO | 2009/014221 | 1/2009 |

OTHER PUBLICATIONS

Notification of Reason(s) for Rejection issued Nov. 12, 2013 in corresponding Japanese patent application No. 2009-074903, with partial English translation.

International Search Report issued Jun. 15, 2010 in International (PCT) Application No. PCT/JP2010/055304.

Yoshihito Kawamura et al., "*Electron Beam Welding of Zr-Based Bulk Metallic Glass to Crystalline Zr Metal*", Materials Transactions, vol. 42, No. 12 (2001), pp. 2649-2651.

* cited by examiner

METHOD OF WELDING METHOD, WELDING METHOD AND WELDED JOINT BODY

BACKGROUND OF THE INVENTION

1. Technical Field

The present invention relates to a method of designing a welding method, a welding method, a welded joint body and the like. More particularly, the present invention relates to a method of designing a welding method in which a metal glass and a crystalline metal satisfying given conditions are selected and thus a welded joint body having a sufficient strength is obtained, a welding method, a welded joint body and the like, and also relates to a welded joint body in which a metal glass and a crystalline metal are joined by welding and a joint body having a sufficient strength is obtained and the like.

2. Description of the Related Art

A metal glass that is formed with a nanocrystalline metal or an amorphous metal has excellent properties in strength and hardness, abrasion resistance, corrosion resistance and the like; it is expected that the metal glass will be utilized in many fields.

However, although the metal glass has such excellent properties, it disadvantageously has difficulties in processing and weldability. While, in order for the fields of its applications to be extended, a welding joining technology between metal glasses is important, in order to produce actual device components and the like, it is necessary to have a technology for joining a metal glass and a crystalline metal (actually used metal material) having a crystalline structure. As joining means for realizing the joining technology, examples in which an explosion bonding method, a friction pressure welding method and a welding method are applied have been reported.

However, when, as the joining means, a welding method of melding a joined portion is applied, a metal glass and a crystalline metal melt together in a molten portion formed on a butt surface to reduce a glass formation ability and thus form a brittle intermetallic compound, with the result that a joint body having a sufficient weld strength often fails to be obtained.

Hence, Materials Transactions, Vol. 42. No. 12 (2001), p. 2649-2651 discloses as an example that, since welding using, as a welding heating source, a high energy beam such as an electron beam or a laser beam that can form a sharp melting shape and that is suitable for local rapid heating and rapid cooling reduces the melting of both joint members in the welded portion and achieves the rapid heating and the rapid cooling, a welding method of applying the high energy beam to the butt surface between the metal glass and the crystalline metal is applied.

SUMMARY OF THE INVENTION

1. Problems to be Solved

In specific combinations of the metal glass and the crystalline metal, even if the welding method described above is applied and many design ideas are made, a joint body having a sufficient strength may fail to be obtained. In other words, by selecting a metal glass and a crystalline metal satisfying given conditions, it is possible to obtain a joint body having a sufficient strength.

In view of the foregoing, the present invention is made; in one aspect of the present invention, an object of the present invention is to provide a design method of a welding method in which a metal glass and a crystalline metal satisfying given conditions are selected and thus a joint body having a sufficient strength is obtained, a welding method and a welded joint body. In another aspect of the present invention, an object of present invention is to provide a welded joint body in which a metal glass and a crystalline metal are joined by welding and a joint body having a sufficient strength is obtained.

2. Means of Solving the Problems

According to one aspect of the present invention, there is provided a design method of a welding method of welding a metal glass formed with a nanocrystalline metal or an amorphous metal and a crystalline metal having a crystalline structure, wherein the welding method includes: applying energy to an interface where the metal glass and the crystalline metal make contact with each other or to the metal glass near the interface; heating and melting the metal glass to form a molten layer; and joining the metal glass to the crystalline metal, and the molten layer after the metal glass and the crystalline metal have been joined together has a glass formation ability, and wherein the design method designs a welding method by selecting a metal glass and a crystalline metal such that the metal glass has a glass formation ability in which a nose time of a TTT curve when a solid of the metal glass is reheated is 0.2 seconds or more, and the metal glass and crystalline metal satisfy a temperature range of a temperature of the metal glass at which a spread factor of the crystalline metal that has not been melted and the molten metal glass is 25% or more and a melting point of the crystalline metal to be 100 k or more.

In the design method of the welding method according to one aspect of the present invention, a welding method can be designed by selecting a metal glass and a crystalline metal that satisfy a temperature range of a temperature of the metal glass at which the spread factor in the design method is 25% or more and the melting point of the crystalline metal to be 450 k or more and preferably 800 K or more.

According to one aspect of the present invention, there is provided a design method of designing a welding method of welding a metal glass formed with a nanocrystalline metal or an amorphous metal and a crystalline metal having a crystalline structure, wherein the welding method includes: applying energy to an interface where the metal glass and the crystalline metal make contact with each other or to the metal glass near the interface; heating and melting the metal glass to form a molten layer; and joining the metal glass to the crystalline metal, and the molten layer after the metal glass and the crystalline metal have been joined together has a glass formation ability, and wherein the design method designs a welding method by selecting a metal glass and a crystalline metal such that the metal glass has a glass formation ability in which a nose time of a TTT curve when a solid of the metal glass is reheated is 0.2 seconds or more, and the metal glass and crystalline metal satisfy a temperature range of a temperature of the metal glass at which a spread factor of the crystalline metal that has not been melted and the molten metal glass is 25% or more and a melting point of the crystalline metal to be 9.7% or more of a melting point of the metal glass.

Preferably, in the design method of the welding method according to one aspect of the present invention, the molten layer after the metal glass and the crystalline metal have been joined together makes contact with the interface and has a nipple-shaped protrusion positioned on a side of the metal glass of the interface. Thus it is possible to obtain sufficient joining strength.

Preferably, in the design method of the welding method according to one aspect of the present invention, a maximum temperature of the interface heated at the time of welding is 95% or less of the melting point of the crystalline metal. Thus, it is possible to prevent the nipple-shaped protrusion from being separated from the interface.

According to one aspect of the present invention, there is provided a welding method including: applying energy to an interface where a metal glass formed with a nanocrystalline metal or an amorphous metal and a crystalline metal having a crystalline structure make contact with each other or to the metal glass near the interface; forming a molten layer by heating and melting the metal glass; and joining the metal glass to the crystalline metal, wherein the molten layer after the metal glass and the crystalline metal have been joined together has a glass formation ability;

the metal glass has a glass formation ability in which a nose time of a TTT curve when a solid of the metal glass is reheated is 0.2 seconds or more; and the metal glass and the crystalline metal are formed with a material that satisfies a temperature range of a temperature of the metal glass at which a spread factor of the crystalline metal that has not been melted and the molten metal glass is 25% or more and a melting point of the crystalline metal to be 500 K or more.

According to one aspect of the present invention, there is provided a welding method including: applying energy to an interface where a metal glass formed with a nanocrystalline metal or an amorphous metal and a crystalline metal having a crystalline structure make contact with each other or to the metal glass near the interface; forming a molten layer by heating and melting the metal glass; and joining the metal glass to the crystalline metal, wherein the molten layer after the metal glass and the crystalline metal have been joined together has a glass formation ability;

the metal glass has a glass formation ability in which a nose time of a TTT curve when a solid of the metal glass is reheated is 0.2 seconds or more; and the metal glass and the crystalline metal are formed with a material that satisfies a temperature range of a temperature of the metal glass at which a spread factor of the crystalline metal that has not been melted and the molten metal glass is 25% or more and a melting point of the crystalline metal to be 48% or more of a melting point of the metal glass.

Preferably, in the welding method according to one aspect of the present invention, in the welding method, a maximum temperature of the interface heated at the time of welding is 95% or less of the melting point of the crystalline metal.

Preferably, in the welding method according to one aspect of the present invention, the molten layer after the metal glass and the crystalline metal have been joined together makes contact with the interface and has a nipple-shaped protrusion positioned on a side of the metal glass of the interface.

Preferably, in the welding method according to one aspect of the present invention, the energy applied to the interface or the metal glass near the interface is energy by laser, an electron beam or pulse energization.

According to one aspect of the present invention, there is provided a welded joint body in which a metal glass formed with a nanocrystalline metal or an amorphous metal and a crystalline metal having a crystalline structure are joined by welding, wherein a molten layer is formed by the welding on an interface where the metal glass and the crystalline metal are joined;

the molten layer makes contact with the interface and has a nipple-shaped protrusion positioned on a side of the metal glass of the interface; and the molten layer has a glass formation ability.

Preferably, in the welded joint body according to one aspect of the present invention, the nipple-shaped protrusion has a height of 1 μm or less and an aspect ratio of 1 or more and 2 or less.

Preferably, in the welded joint body according to one aspect of the present invention, the metal glass has a glass formation ability in which a nose time of a TTT curve when a solid of the metal glass is reheated is 0.2 seconds or more, and the metal glass and the crystalline metal are formed with a material that satisfies a temperature range of a temperature of the metal glass at which a spread factor of the crystalline metal that has not been melted and the molten metal glass is 25% or more and a melting point of the crystalline metal to be 100 k or more.

Preferably, in the welded joint body according to one aspect of the present invention, the metal glass has a glass formation ability in which a nose time of a TTT curve when a solid of the metal glass is reheated is 0.2 seconds or more, and the metal glass and the crystalline metal are formed with a material that satisfies a temperature range of a temperature of the metal glass at which a spread factor of the crystalline metal that has not been melted and the molten metal glass is 25% or more and a melting point of the crystalline metal to be 9.7% or more of a melting point of the metal glass.

According to one aspect of the present invention, there is provided a welded joint body in which a metal glass formed with a nanocrystalline metal or an amorphous metal and a crystalline metal having a crystalline structure are joined by welding, in which a molten layer that is formed by the welding on a surface where the metal glass and the crystalline metal are joined has a glass formation ability, the metal glass has a glass formation ability in which a nose time of a TTT curve when a solid of the metal glass is reheated is 0.2 seconds or more, and the metal glass and the crystalline metal are formed with a material that satisfies a temperature range of a temperature of the metal glass at which a spread factor of the crystalline metal that has not been melted and the molten metal glass is 25% or more and a melting point of the crystalline metal to be 500 K or more.

According to one aspect of the present invention, there is provided a welded joint body in which a metal glass formed with a nanocrystalline metal or an amorphous metal and a crystalline metal having a crystalline structure are joined by welding, in which a molten layer that is formed by the welding on a surface where the metal glass and the crystalline metal are joined has a glass formation ability, the metal glass has a glass formation ability in which a nose time of a TTT curve when a solid of the metal glass is reheated is 0.2 seconds or more, and the metal glass and the crystalline metal are formed with a material that satisfies a temperature range of a temperature of the metal glass at which a spread factor of the crystalline metal that has not been melted and the molten metal glass is 25% or more and a melting point of the crystalline metal to be 48% or more of the melting point of the metal glass.

3. Effects of the Invention

In one aspect of the present invention, it is possible to provide a design method of a welding method in which a metal glass and a crystalline metal satisfying given conditions are selected and thus a joint body having a sufficient strength is obtained, a welding method and a welded joint body. In another aspect of the present invention, it is possible to provide a welded joint body in which a metal glass and a crystalline metal are joined by welding and a joint body having a sufficient strength is obtained.

DETAILED DESCRIPTION OF THE INVENTION

An embodiment of the present invention will be described in detail below with reference to accompanying drawings. However, those skilled in the art easily understand that the present invention is not limited to the following description and that many modifications in aspects and details are possible without departing from the spirit and scope of the present invention. Therefore, the present invention is not interpreted as being limited to the following description of the embodiment.

The embodiment of the present invention deals with a design method of designing a welding method of welding a metal glass formed with a nanocrystalline metal or an amorphous metal and a crystalline metal having a crystalline structure.

Figure 1:
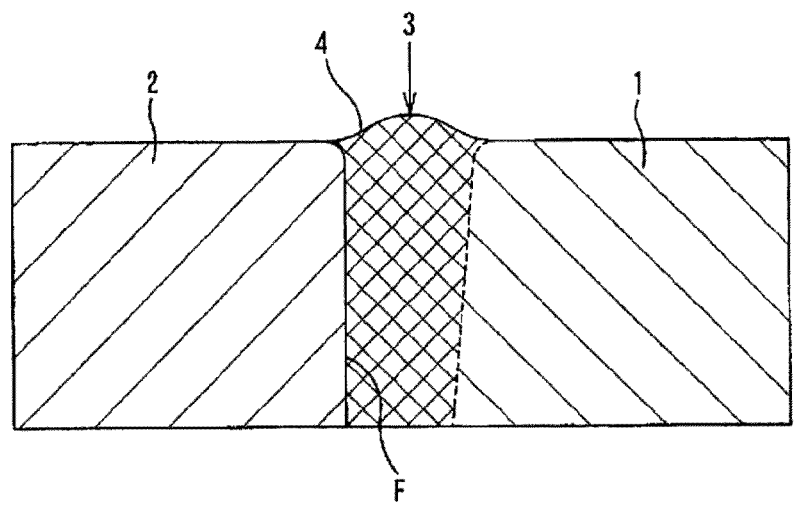
FIG. 1 is a cross-sectional view showing the state of formation of a molten layer obtained by applying a high energy beam to a joint interface between a metal glass and a crystalline metal.

As shown in FIG. 1, the welding method is a method in which a high energy is applied either by application of a high energy beam or by being energized through pulses to an interface 3 where a metal glass 1 and a crystalline metal 2 makes contact with each other or to the metal glass 1 in the vicinity of the interface, the metal glass 1 is heated to form a molten layer (bead) 4 and the metal glass 1 and the crystalline metal 2 are joined. The high energy beam is either an electron beam or a laser beam.

The molten layer 4 after the joining of the metal glass 1 and the crystalline metal 2 is a metal glass that falls within a range of a composition ratio corresponding to glass formation ability.

The glass formation ability mentioned above will now be described in detail using a TTT curve for crystallization shown in FIG. 2.

Figure 2:
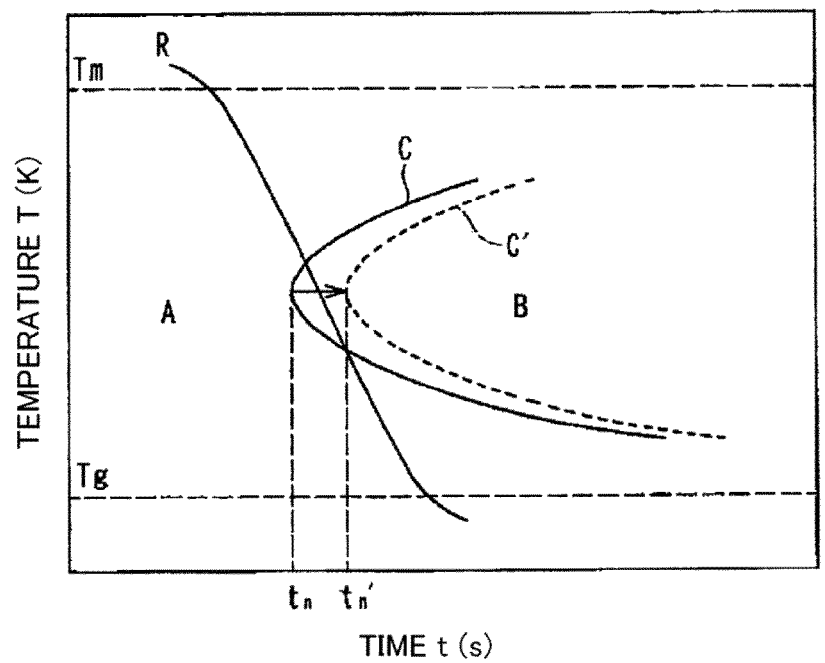
FIG. 2 is a diagram showing a TTT curve for crystallization of the metal glass.

The vertical axis of FIG. 2 represents a temperature T (K); the horizontal axis represents a time t (s) with log. A region shown in FIG. 2 is a glass phase (including a supercooling liquid phase); B region is a crystalline phase; tn represents a nose time of a crystallization start curve C.

When the molten layer 4 is rapidly cooled from a molten state of a melting point Tm or more along a cooling curve R in the TTT curve shown in FIG. 2, if the cooling curve R is present in the side of the crystallization start curve C greater than the nose time tn (if the cooling curve R intersects the crystallization start curve C), an intermetallic compound is formed as a crystalline body.

By contrast, conditions for the application of the high energy to the interface 3 between the metal glass 1 and the crystalline metal 2 or the crystalline metal 2 in the vicinity thereof are changed variously, for example, the application of the high energy beam is shifted from the interface 3 to the side of the metal glass 1, and thus the component composition of the molten layer 4 falls within the range of the composition ratio corresponding to the glass formation ability, the nose time tn' of the crystallization start curve C' is shifted to a greater side as indicated by an arrow, the cooling curve R does not intersect the crystallization start curve C' and a crystalline metal is not formed in the molten layer 4.

The nose time tn of the crystallization start curve is preferably 2.0 seconds or more so that the component composition of the molten layer 4 stably falls within a range of the composition ratio corresponding to the glass formation ability.

Here, as the TTT curve for the crystallization of the metal glass, there are two types of curves, that is, a curve obtained by cooling from a liquid and a curve obtained by reheating the solid of the metal glass; the latter is shifted more than the former to the side of a shorter time by about one order. In other words, when the welding is performed, a heat affected portion (a portion that is not heated up to the melting point) is crystallized more easily than the molten layer 4. In order for the heat affected portion to be prevented from being crystallized at the time of the welding, in the metal glass 1, the nose time tn of the TTT curve for reheating of the its glass solid needs to be 0.2 seconds or more; this corresponds to a metal glass having a glass formation ability in which the nose time tn of the TTT curve for cooling from a liquid is 2.8 seconds or more.

Although, as described above, if the nose time tn for the crystallization of the molten layer is 2.0 seconds or more, the molten layer is changed into an amorphous state, it is considered that the heat affected portion on the side of the metal glass may be crystallized. In order for the heat affected portion on the side of the metal glass to be prevented from being crystallized, the metal glass needs to have a glass formation ability in which the nose time tn of the TTT curve for cooling from a liquid is 2.8 seconds or more.

The design method described above is a method of designing a welding method by selecting the metal glass 1 and the crystalline metal 2 that satisfy conditions (1) and (2) below.

(1) A glass ability in which the nose time of the TTT curve for the reheating of the solid of the metal glass 1 is 0.2 seconds or more is acquired.

(2) The temperature range of the temperature of the metal glass 1 in which the spread factor of the crystalline metal 2 that is not melted and the molten metal glass 1 is 25% or more and the melting point of the crystalline metal 2 is 100 K or more, preferably 450 K or more and more preferably 800 K or more.

The design method described above is a method of designing a welding method by selecting the metal glass 1 and the crystalline metal 2 that satisfy conditions (1) and (3) below.

(1) A glass ability in which the nose time of the TTT curve for the reheating of the solid of the metal glass 1 is 0.2 seconds or more is acquired.

(3) The temperature range of the temperature of the metal glass in which the spread factor of the crystalline metal that is not melted and the molten metal glass is 25% or more and the melting point of the crystalline metal is 9.7% or more of the melting point of the metal glass, preferably 43.5% or more and more preferably 77.5% or more.

The spread factor mentioned above will now be described in detail.

Figure 3:
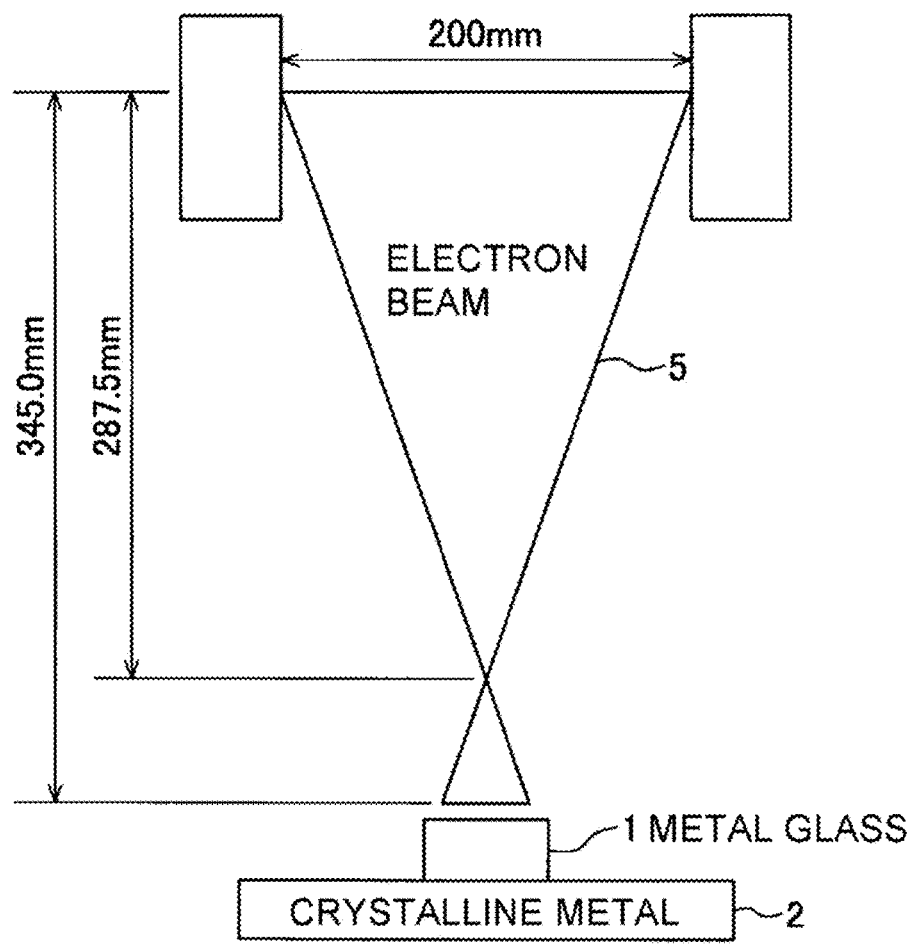
FIG. 3 is a schematic diagram for illustrating a method of a wettability test.
Figure 4:
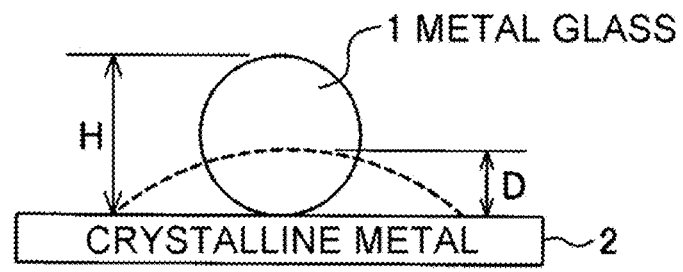
FIG. 4 is a schematic cross-sectional view for illustrating a method of calculating a spread factor by the wettability test shown in FIG. 3.

FIG. 3 is a schematic diagram illustrating a method of performing a wettability test. FIG. 4 is a schematic cross-sectional view illustrating a method of calculating a spread factor by the wettability test shown in FIG. 3.

As shown in FIG. 3, the metal glass 1 in the shape of a rectangular parallelepiped is placed on the plate-shaped crystalline metal 2, and an electron beam 5 is applied to the metal glass 1. Thus, the metal glass 1 is melted.

As the metal glass 1, for example, $Zr_{41}Be_{23}Ti_{14}Cu_{12}Ni_{10}$ BMG is used; the melting point Tm of the metal glass is 1030 K. As the crystalline metal 2, for example, Al (melting point 933 K), Cu (melting point 1356 K), Ni (melting point 1726 K), Fe (melting point 1808 K), Ti (melting point 1953 K), Zr (melting point 2128 K), Nb (melting point 2793 K) and Ta (melting point 3290 K) are used.

Test conditions in this case are as follows.
Acceleration voltage: 60 volts
Beam current: 5 mA
Metal glass size: 2 mm×4 mm×4 mm
Irradiation time: 1 to 30 seconds When the height of the metal glass 1 shown in FIG. 4 is assumed to be H, and the height of the molten metal glass is assumed to be D, the spread factor (%) is calculated in a method indicated by the following formulas.

Spread factor (%)=$(H-D)/H \times 100$ $H=1.24 \times V^{1/3}$ $V=M/d$ where M represents the mass of the metal glass and d represents the density of the metal glass.

Since composition observation on the joint interface between the crystalline metal and the metal glass obtained by performing the wettability test shown in FIGS. 3 and 4 was performed on a minute region XRD by SEM-EDX, its result will be described later.

Figure 5:
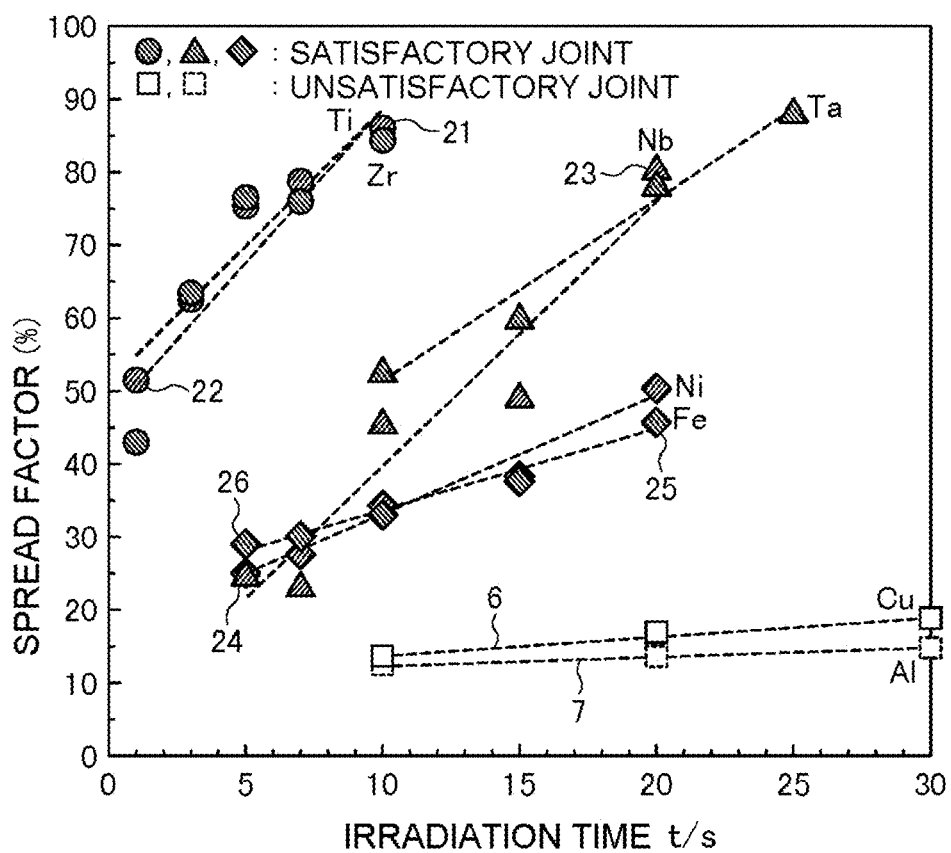
FIG. 5 is a diagram showing a relationship between the irradiation time of an electron beam and the spread factor (%)

FIG. 5 shows the result obtained by performing the wettability test shown in FIGS. 3 and 4 and is a diagram showing a relationship between the irradiation time of an electron beam and the spread factor (%).

Reference numeral 6 shown in FIG. 5 represents a relationship between the irradiation time and the spread factor when the crystalline metal is Cu; reference numeral 7 represents a relationship between the irradiation time and the spread factor when the crystalline metal is Al.

The joining of the crystalline metals Cu and Al to the metal glass was unsatisfactory whereas the joining of the crystalline metals Ti, Zr, Nb, Ta, Ni and Fe to the metal glass was satisfactory.

Figure 6:
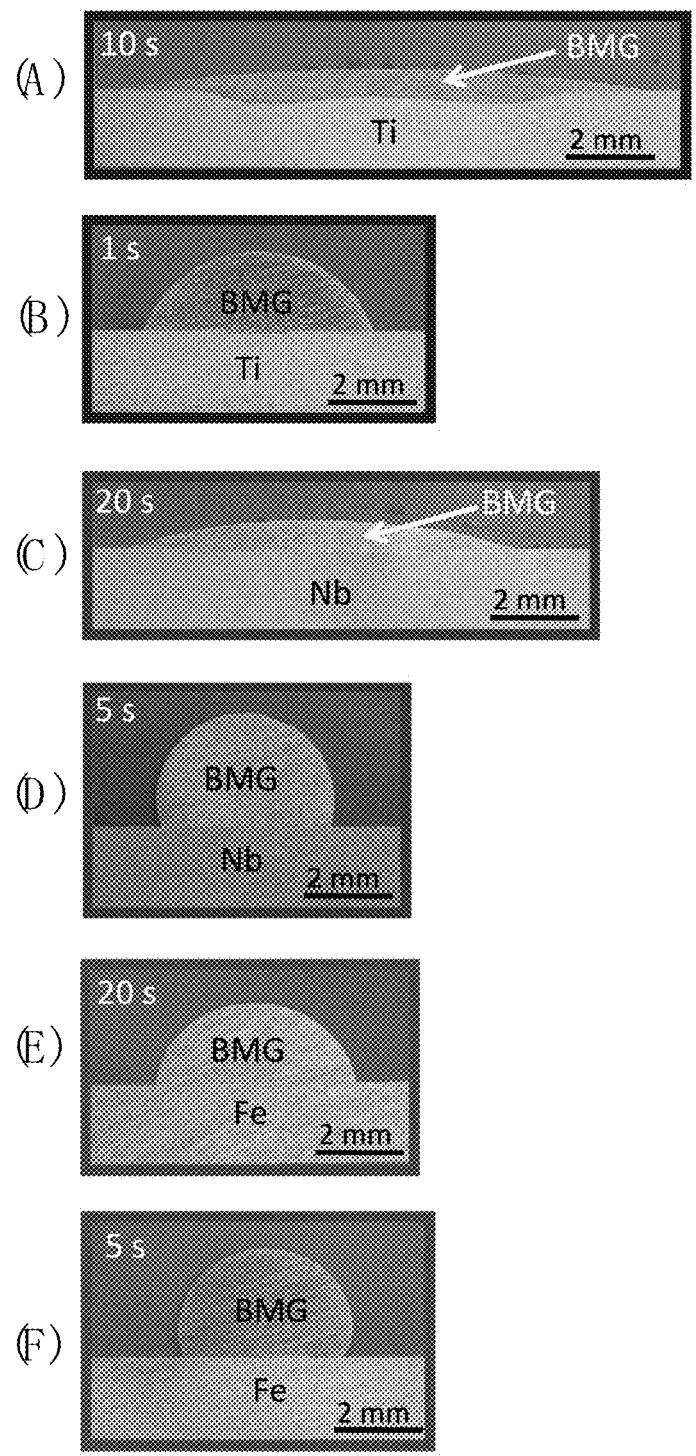
FIGS. 6(A) to 6(F) are cross-sectional photographs obtained by observing the joint interface between the metal glass and the crystalline metal.

FIG. 6(A) is a cross-sectional photograph obtained by observing the joint interface between the crystalline metal and the metal glass after the electron beam is applied for 10 seconds to the metal glass (BMG) placed on the crystalline metal of Ti, and corresponds to a specimen indicated by reference numeral 21 of FIG. 5.

FIG. 6(B) is a cross-sectional photograph obtained by observing the joint interface between the crystalline metal and the metal glass after the electron beam is applied for 1 second to the metal glass (BMG) placed on the crystalline metal of Ti, and corresponds to a specimen indicated by reference numeral 22 of FIG. 5.

FIG. 6(C) is a cross-sectional photograph obtained by observing the joint interface between the crystalline metal and the metal glass after the electron beam is applied for 20 seconds to the metal glass (BMG) placed on the crystalline metal of Nb, and corresponds to a specimen indicated by reference numeral 23 of FIG. 5.

FIG. 6(D) is a cross-sectional photograph obtained by observing the joint interface between the crystalline metal and the metal glass after the electron beam is applied for 5 seconds to the metal glass (BMG) placed on the crystalline metal of Nb, and corresponds to a specimen indicated by reference numeral 24 of FIG. 5.

FIG. 6(E) is a cross-sectional photograph obtained by observing the joint interface between the crystalline metal and the metal glass after the electron beam is applied for 20 seconds to the metal glass (BMG) placed on the crystalline metal of Fe, and corresponds to a specimen indicated by reference numeral 25 of FIG. 5.

FIG. 6(F) is a cross-sectional photograph obtained by observing the joint interface between the crystalline metal and the metal glass after the electron beam is applied for 5 seconds to the metal glass (BMG) placed on the crystalline metal of Fe, and corresponds to a specimen indicated by reference numeral 26 of FIG. 5.

Figure 7:
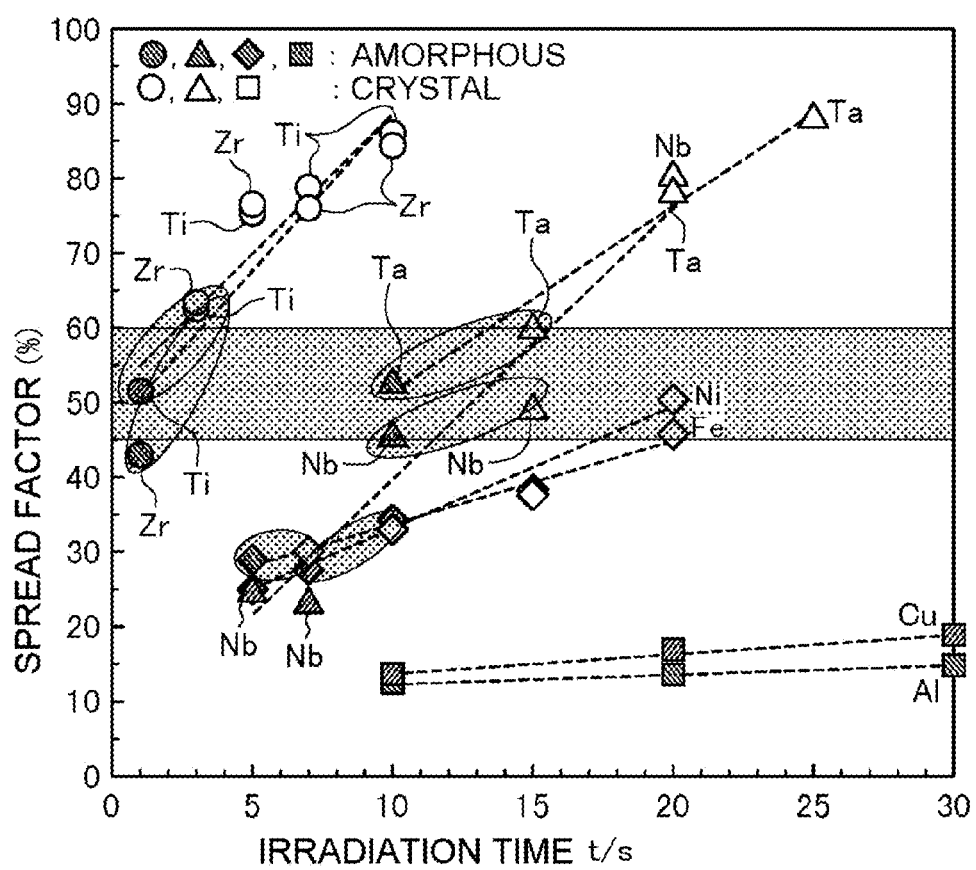
FIG. 7 is a diagram showing a relationship between the irradiation time of the electron beam and the spread factor (%)

FIG. 7 shows the result obtained by performing the wettability test shown in FIGS. 3 and 4 and is a diagram showing a relationship between the irradiation time of an electron beam and the spread factor (%).

In FIG. 7, points where rounds and the like are filled in indicate that the metal glass is in an amorphous state, and points where the rounds and the like are not filled in indicate that the metal glass is in a crystalline state.

Figure 8:
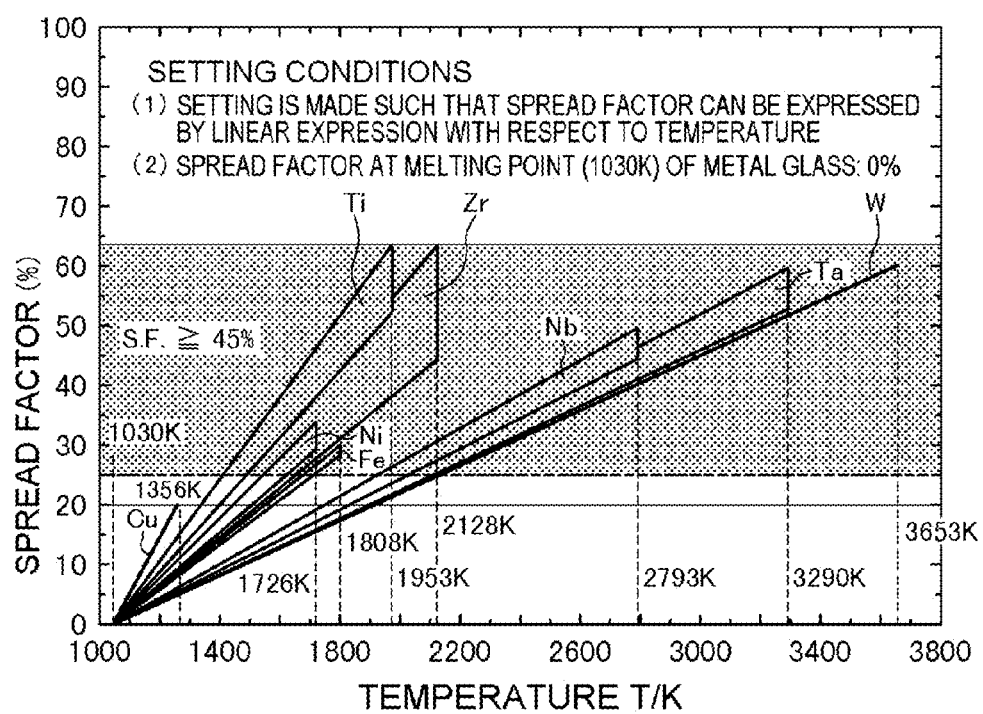
FIG. 8 is a diagram showing a relationship between the irradiation time of the electron beam and the spread factor (%)

FIG. 8 shows the result obtained by performing the wettability test shown in FIGS. 3 and 4 and is a diagram showing a relationship between the irradiation time of an electron beam and the spread factor (o).

FIG. 8 is a diagram made by setting such that the spread factor can be expressed as a linear expression with respect to the temperature and that the spread factor is 0% at the melting point (1030 K) of the metal glass.

FIG. 8 shows that, in the temperature range of the temperature of the metal glass in which the spread factor of the crystalline metal that is not melted and the molten metal glass is 25% or more and the melting point of the crystalline metal, the molten layer of the metal glass is formed, and thus it is possible to obtain a joint body in which the metal glass is not crystallized and which has a sufficient strength. Specifically, in the case of Fe, the temperature range is about 107 K; in the case of Ni, the temperature range is about 118 K; in the case of Ti, the temperature range is about 436 K; in the case of Zr, the temperature range is about 483 K; in the case of Nb, the temperature range is about 804 K; in the case of Ta, the temperature range is about 1183 K; and, in the case of W, the temperature range is about 1532 K. As the temperature range becomes wider, the margin of the welding conditions is increased, and welding for obtaining a joint body having a sufficient strength is easily performed. On the other hand, as the temperature range becomes narrower, the margin of the welding conditions is decreased, and the welding for obtaining a joint body having a sufficient strength is difficult to perform. Therefore, the temperature range is preferably 100 K or more, more preferably 450 K or more and further preferably 800 K or more.

The temperature range of the temperature of the metal glass in which the spread factor of the crystalline metal that is not melted and the molten metal glass is 25% or more and the melting point of the crystalline metal is 9.7% or more of the melting point of the metal glass, preferably 43.5% or more and more preferably 77.5% or more, with the result that it is possible to obtain a joint body in which the metal glass is not crystallized and which has a sufficient strength. Specifically, in the case of Fe, the temperature range is about 10.4% of the melting point of the metal glass; in the case of Ni, the temperature range is about 11.5% of the melting point of the metal glass; in the case of Ti, the temperature range is about 44.9% of the melting point of the metal glass; in the case of Zr, the temperature range is about 46.9% of the melting point of the metal glass; in the case of Nb, the temperature range is about 78.1% of the melting point of the metal glass; in the case of Ta, the temperature range is about 114.9% of the melting point of the metal glass; and, in the case of W, the temperature range is about 148.7% of the melting point of the metal glass. As the temperature range becomes wider, the margin of the welding conditions is increased, and the welding for obtaining a joint body having a sufficient strength is easily performed. On the other hand, as the temperature range becomes narrower, the margin of the welding conditions is decreased, and the welding for obtaining a joint body having a sufficient strength is difficult to perform. Therefore, the temperature range is preferably 9.7% or more, more preferably 43.5% or more and further preferably 77.5% or more.

FIG. 9(A) is a photograph showing a TEM observation result on the joint interface between the crystalline metal of Ti and the metal glass BMG obtained by the wettability test shown in FIGS. 3 and 4; FIGS. 9(B) to 9(E) are diagrams showing the mapping of Zr, Ti, Cu and Ni in a region surrounded by a quadrangle shown in FIG. 9(A).

Figure 9:
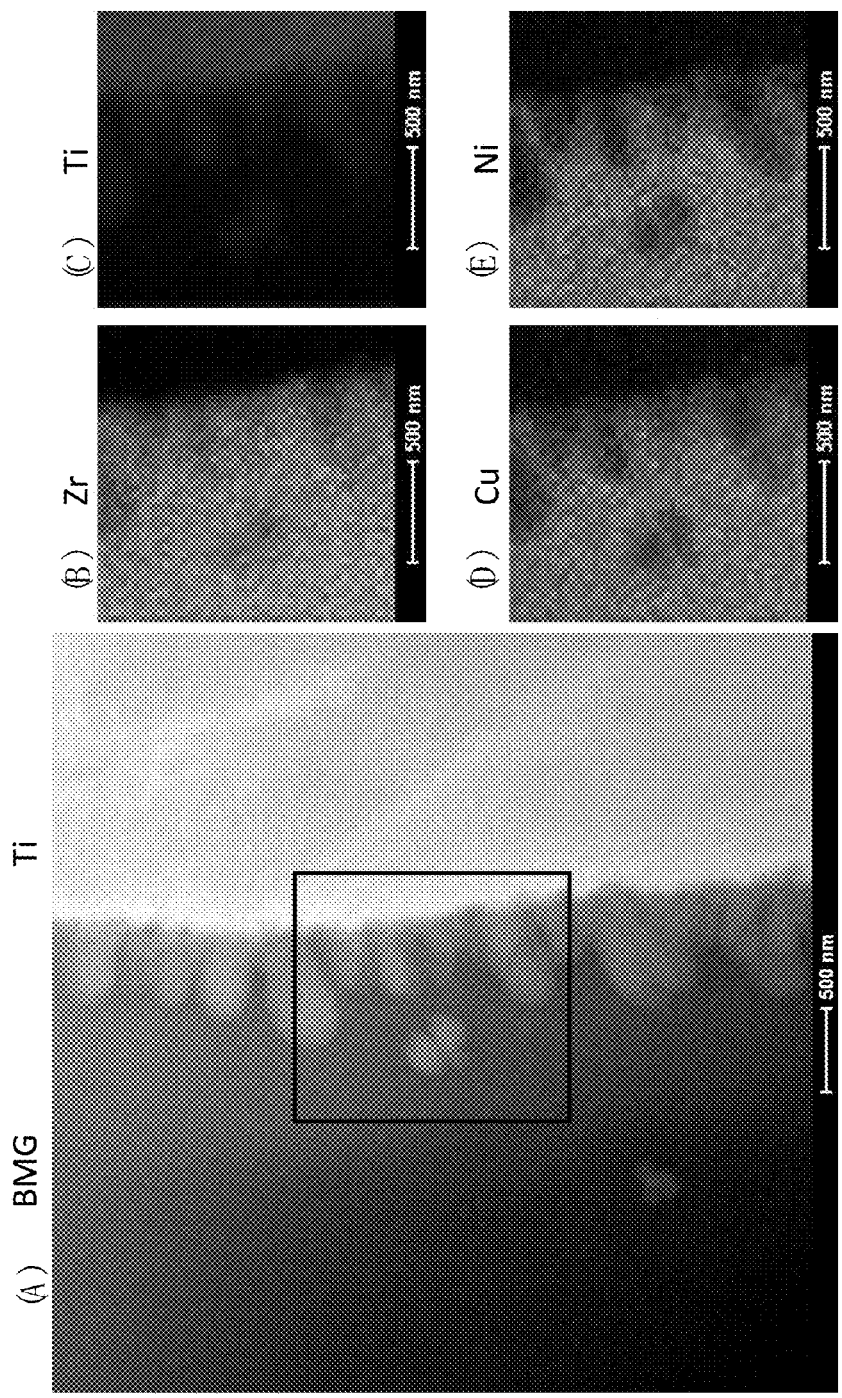
FIG. 9(A) is a photograph showing the result of TEM observation on the joint interface between the crystalline metal of Ti and the metal glass.
FIGS. 9(B) to 9(E) are diagrams showing the mapping of a region surrounded by a quadrangle shown in FIG. 9(A)
Figure 10:
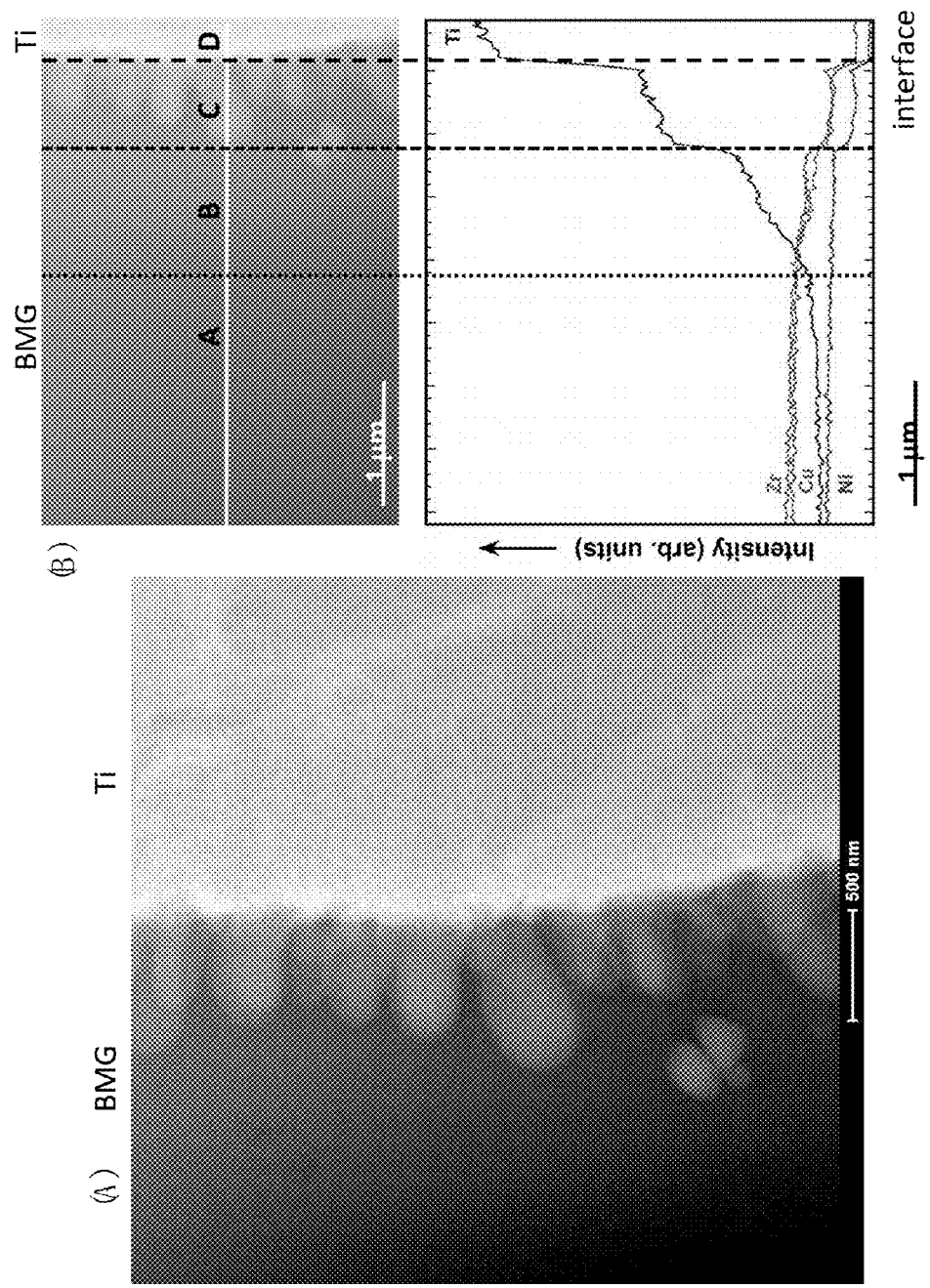
FIG. 10(A) is a photograph showing the result of TEM observation on the joint interface between the crystalline metal of Ti and the metal glass.
FIG. 10(B) is a diagram showing the result of line analysis on the joint interface.
Figure 11:
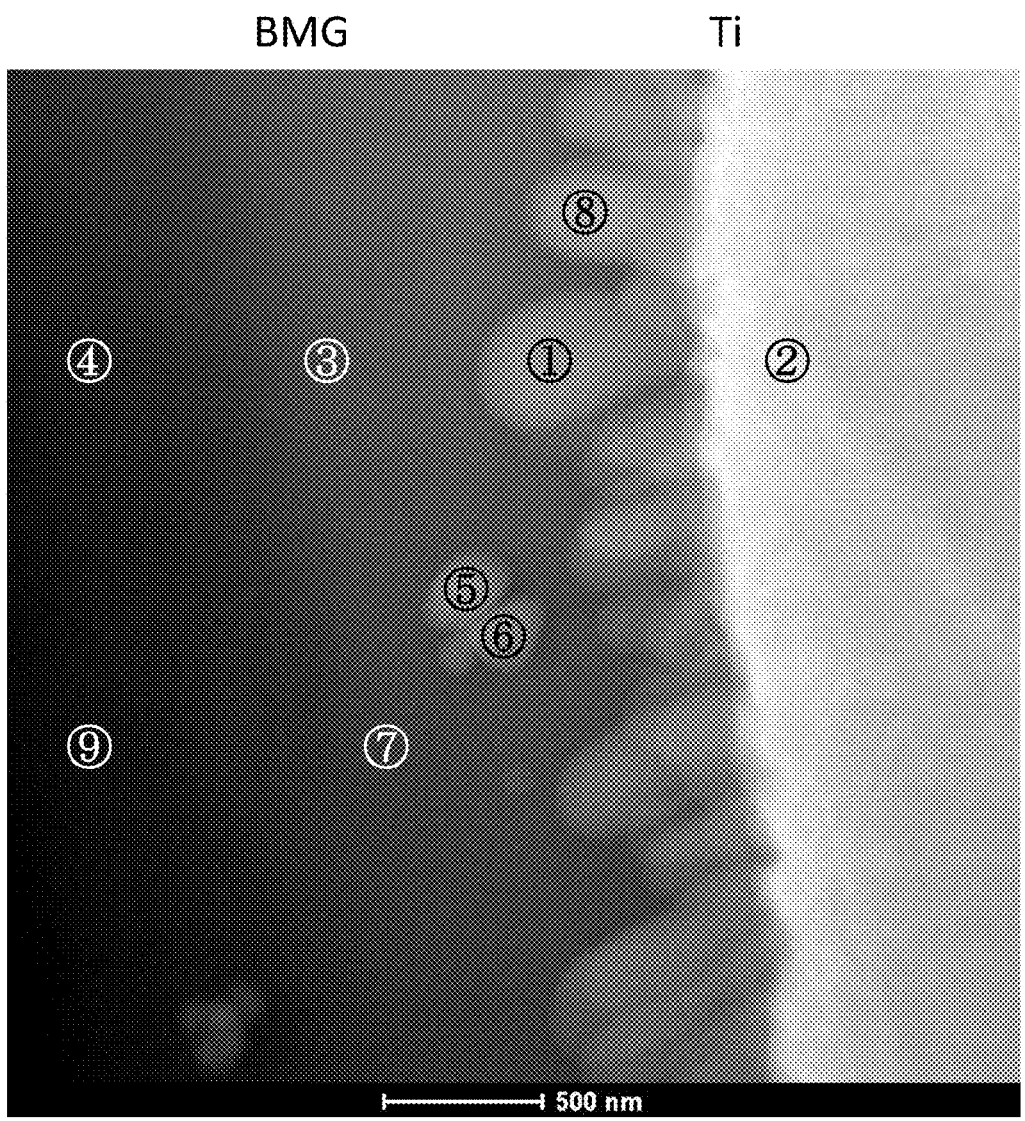
FIG. 11 is a photograph showing the result of TEM observation on the joint interface between the crystalline metal of Ti and the metal glass.

FIGS. 9 to 11 show a specimen of the joint interface. The joining conditions are that a transformer winding number ratio is 40, a joining pressure is 170 MPa, the length of protrusion of the metal glass is 0.5 mm, the length of protrusion of Ti is 3.0 mm and a charging voltage is 320 volts.

FIG. 10(A) is a photograph showing a TEM observation result on the joint interface between the crystalline metal of Ti and the metal glass BMG obtained by the wettability test shown in FIGS. 3 and 4; FIG. 10(B) is a diagram showing a line analysis result on the joint interface between the crystalline metal of Ti and the metal glass BMG.

FIG. 11 is a photograph showing a TEM observation result on the joint interface between the crystalline metal of Ti and the metal glass obtained by the wettability test shown in FIGS. 3 and 4.

Table 1 shows a spot analysis result on points (1) to (9) shown in FIG. 11.

TABLE 1

|  | Zr | Ti | Cu | Ni | Be |
| --- | --- | --- | --- | --- | --- |
| BMG | 41 | 14 | 12 | 10 | 23 |
|  | 53 | 18 | 16 | 13 | — |
| (1) | 21.5 | 60.2 | 13.4 | 4.9 | — |
| (2) | 0 | 96.6 | 3.4 | 0 | — |
| (3) | 29.8 | 37.7 | 20.2 | 12.3 | — |
| (4) | 42.1 | 19.2 | 27.1 | 11.5 | — |
| (5) | 21.7 | 57.9 | 14.9 | 5.5 | — |
| (6) | 20.8 | 55.9 | 15.4 | 7.8 | — |
| (7) |  |  |  |  |  |
| (8) | 20.8 | 67.5 | 8.9 | 2.8 | — |
| (9) | 41.1 | 21.7 | 24.3 | 12.9 | — | at. %

As shown in FIGS. 9 to 11 and table 1, it has been recognized that the molten layer on the side of the metal glass of the joint interface between the metal glass BMG and the crystalline metal of Ti makes contact with the interface and has nipple-shaped protrusions positioned on the side of the metal glass of the interface, and that the molten layer has 90% or more of the nipple-shaped protrusions whose height is 1 μm or less and whose aspect ratio is one or more but two or less. It has also been recognized that those nipple-shaped protrusions are formed on the molten layer in which the joint body having a sufficient strength is obtained and that, in the molten layer in which the nipple-shaped protrusions are separated from the interface, the joint body having a sufficient strength cannot be obtained.

It has also been recognized that whether or not the nipple-shaped protrusions are separated from the interface depends on whether or not the maximum temperature when the interface is heated at the time of welding is 95% or less of the melting point of the crystalline metal of Ti. In other words, when the maximum temperature is 95% or less of the melting point of the crystalline metal of Ti, the nipple-shaped protrusions are not separated from the interface whereas, when the maximum temperature exceeds 95% of the melting point of the crystalline metal of Ti, the nipple-shaped protrusions are separated from the interface.

For example, when the crystalline metal is W, a diffusion coefficient for Zr (main amorphous element) at a temperature that is 95% of the melting point of W is $1.269 \times 10^{-8}$ m$^2$/second. That is, the maximum temperature of the interface is set to such a temperature that an impurity diffusion coefficient for the molten metal glass is $1.269 \times 10^{-8}$ or less, and thus it is possible to prevent the nipple-shaped protrusions from being separated from the interface.

When the nipple-shaped protrusions are separated from the interface, this causes the occurrence of cracks or the reduction of toughness. In other words, the formation of the nipple-shaped protrusions on the interface makes it possible to geometrically obtain a rigid joint.

The nipple-shaped protrusions are observed in ordinary joining (brazing or soldering) on the interface. When different types of materials are joined, both materials diffuse, and thus the nipple-shaped protrusions are produced. The nipple-shaped protrusions allow joining on an atomic level, and thus it is possible to obtain a high joining strength. However, if the nipple-shaped protrusions are brittle, the strength is lowered. In the sample of the present joining, since, as a result of a three-point bending test, the breaking of a joint portion did not occur, the nipple-shaped protrusions are not brittle.

EXAMPLE

Example 1

With respect to pulse energization joining conditions:
the joining conditions were that a transformer winding number ratio was 40, a joining pressure was 170 MPa, the length of protrusion of the metal glass was 0.5 mm, the length of protrusion of the crystalline metal was fixed to 3.0 mm and a charging voltage was changed between 200 and 400 volts.
(Test Materials)

Figure 12:
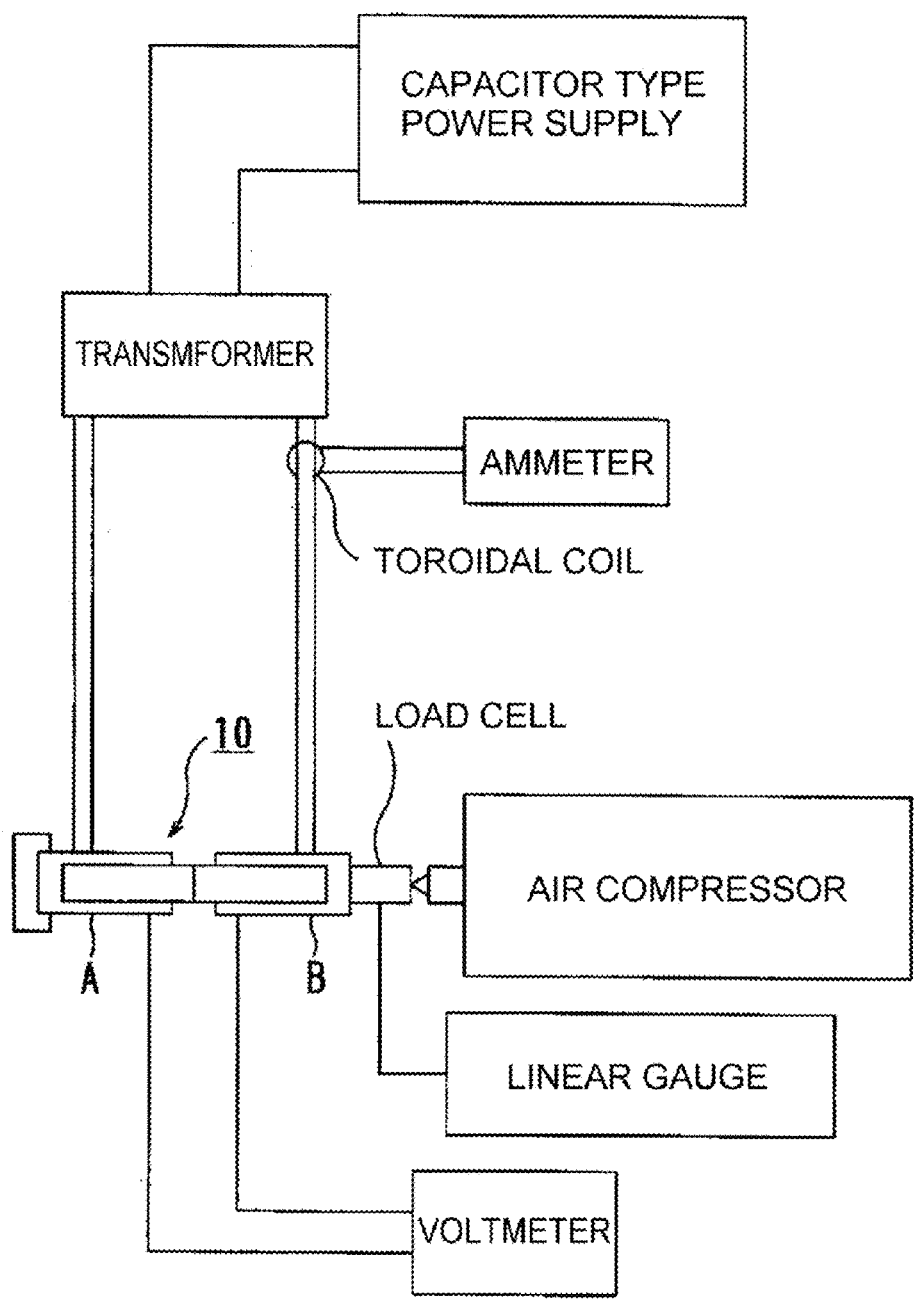
FIG. 12 is a schematic diagram showing a pulse energization joining device used in example 1.

$Zr_{41}Be_{23}Ti_{14}Cu_{12}Ni_{10}/Cu$ $Zr_{41}He_{23}Ti_{14}Cu_{12}Ni_{10}/Ni$ $Zr_{41}He_{23}Ti_{14}Cu_{12}Ni_{10}/Fe$ $Zr_{41}He_{23}Ti_{14}Cu_{12}Ni_{10}/Ti$ $Zr_{41}He_{23}Ti_{14}Cu_{12}Ni_{10}/Zr$ $Zr_{41}He_{23}Ti_{14}Cu_{12}Ni_{10}/Nb$ $Zr_{41}He_{23}Ti_{14}Cu_{12}Ni_{10}/Ta$ $Zr_{41}Be_{23}Ti_{14}Cu_{12}Ni_{10}/W$ (Device Used)
As a pulse energization joining device, an instrumentation pulse energization joining device shown in FIG. 12 was used. In this figure, reference numeral 10 represents a portion that holds the metal glass and the crystalline metal that are specimens to be joined and that joins them.

Figure 13:
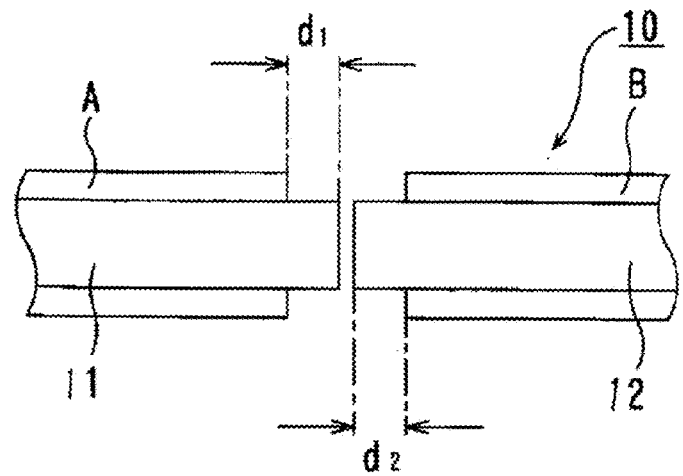
FIG. 13 is an enlarged diagram of a portion 10 to be joined shown in FIG. 12.

FIG. 13 is a diagram showing an enlarged portion 10 to be joined shown in FIG. 12; the metal glass 11 and the crystalline metal 12 that are specimens to be joined are respectively attached to energization holders A and B. Reference numerals d1 and d2 represent the lengths of protrusion of the specimens.
(Joining Conditions)
The joining conditions were that the transformer winding number ratio was 40, the lengths d1 and d2 of protrusion of the specimens shown in FIG. 13 were 0.5 mm, the joining pressure was 168 MPa and the charging voltage was 120-260 volts; energy was stored in a capacitor type power supply; the energy was instantaneously discharged into the transformer and thus a large current was passed therethrough; and a temperature rise caused by Joule heat produced at the joint portion was utilized.
(Joint Evaluation Method)
As the joint evaluation method of evaluating the result of the joining, effects on mechanical properties of the joint portion through the charged voltage were evaluated by performing the three-point bending test. The results thereof are shown in FIG. 14.

Figure 14:
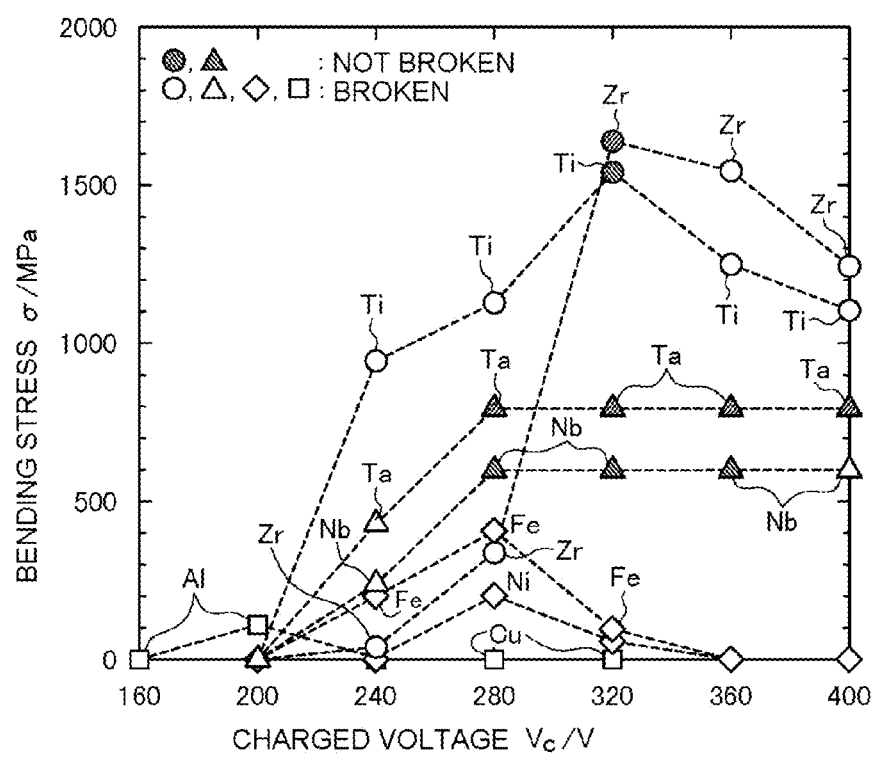
FIG. 14 is a diagram showing a relationship between a charged voltage ($V_c/V$) and a bending stress ($\sigma MPa$)

FIG. 14 shows results obtained by measuring the strength of a welded joint body in which the metal glass and the crystalline metal were joined by the welding method according to the first embodiment of the present invention; FIG. 14 is a diagram showing a relationship between the charged voltage ($V_c/V$) and a bending stress ($\sigma$MPa).

In FIG. 14, points where rounds and the like are filled in indicate specimens that were not broken by the three-point bending test, and points where rounds and the like are not filled in indicate specimens that were broken by the three-point bending test.

FIG. 15(A) is a photograph of the specimen obtained by performing the three-point bending test on the crystalline metal of Ti shown in FIG. 14; FIG. 15(B) is a photograph of the specimen obtained by performing the three-point bending test on the crystalline metal of Fe shown in FIG. 14; and FIG. 15(C) is a photograph of the specimen obtained by performing the three-point bending test on the crystalline metal of Nb shown in FIG. 14.

The appearance photographs shown in FIGS. 15(A) to 15(C) after the three-point test show joint specimens on condition that 320 volts were used for Ti, 280 volts were used for Nb and 280 volts were used for Fe.

Figure 15:
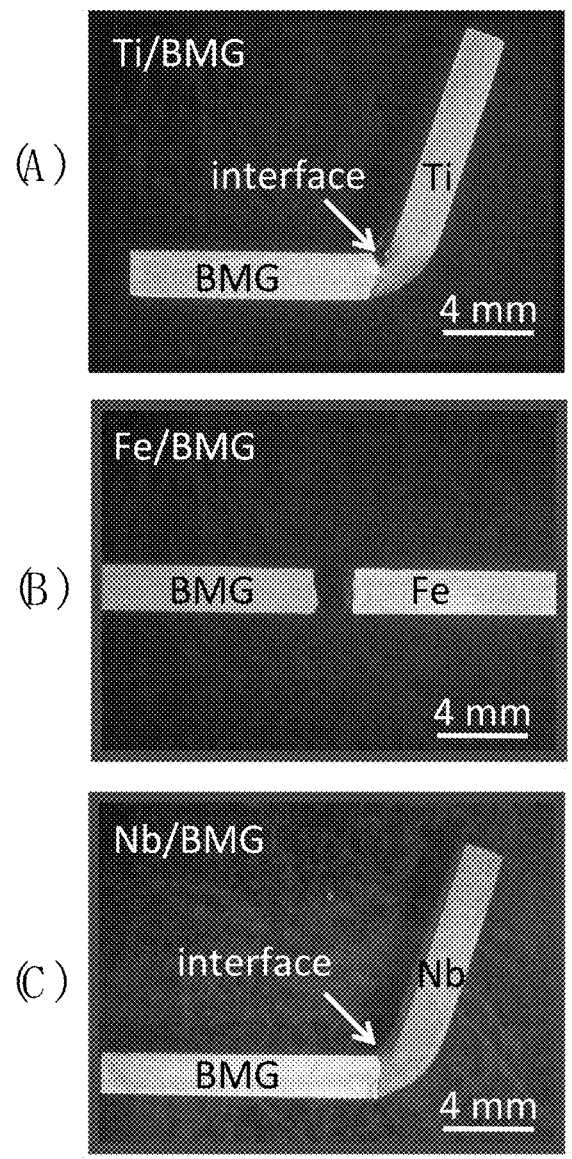
FIGS. 15(A) to 15(C) is photographs of a specimen after a three-point bending test is performed.

FIGS. 14 and 15 show that, when the charged voltage was 200 volts, the joining condition of all the joint bodies was extremely poor but, as the charged voltage was increased, the joining strength was improved. In particular, the joining was satisfactorily performed on Ti, Zr, Nb and Ta without the specimens being broken. Although W was broken, it indicated approximately the same joining strength as Nb. On the other hand, although the strength on Ni and Fe was improved, breaking occurred when the strength was equal to or lower than the yield strength of the crystalline metal, and the joining condition of Cu was extremely poor on all conditions. The joining strength of Ni, Fe, Ti, Zr and Nb was decreased when the charged voltage exceeded a certain charged voltage.

Example 2

With respect to electron beam joining conditions:
(Test Materials)
As test materials, materials shown in Table 2 were used.

TABLE 2

| ELECTRON BEAM JOINING CONDITIONS | SHIFT AMOUNT | TEST MATEIALS | JOINING STRENGTH |
|---|---|---|---|
| 60 kV, 20 mA, 66 mm/s | 0 mm | $Zr_{41}Be_{23}Ti_{14}Cu_{12}Ni_{10}$/Ni | 98 MPa |
| 60 kV, 20 mA, 66 mm/s | 0.2 mm | $Zr_{41}Be_{23}Ti_{14}Cu_{12}Ni_{10}$/Ni | 405 MPa * |
| 60 kV, 20 mA, 66 mm/s | 0.4 mm | $Zr_{41}Be_{23}Ti_{14}Cu_{12}Ni_{10}$/Ni | 155 MPa |
| 60 kV, 16 mA, 60 mm/s | 0.1 mm | $Zr_{41}Be_{23}Ti_{14}Cu_{12}Ni_{10}$/Fe | 253 MPa |
| 60 kV, 18 mA, 60 mm/s | 0.2 mm | $Zr_{41}Be_{23}Ti_{14}Cu_{12}Ni_{10}$/Fe | 421 MPa |

TABLE 2-continued

| ELECTRON BEAM JOINING CONDITIONS | SHIFT AMOUNT | TEST MATEIALS | JOINING STRENGTH |
| --- | --- | --- | --- |
| 60 kV, 20 mA, 60 mm/s | 0.2 mm | $Zr_{41}Be_{23}Ti_{14}Cu_{12}Ni_{10}$/Fe | 625 MPa * |
| 60 kV, 20 mA, 60 mm/s | 0.1 mm | $Zr_{41}Be_{23}Ti_{14}Cu_{12}Ni_{10}$/Nb | 524 MPa * |

* YIELD STRENGTH OF CRYSTALLINE METAL OR MORE (Electron Beam Application Method)

Figure 16:
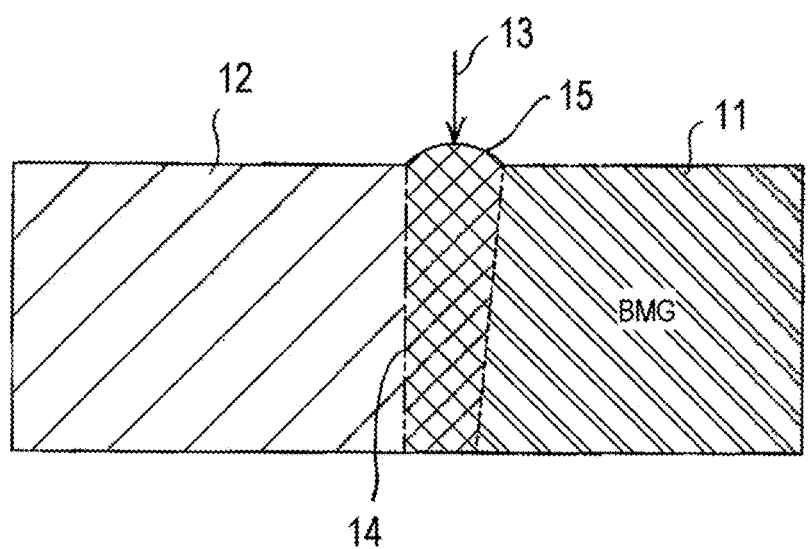
FIG. 16 is a schematic diagram showing the state of welding between the metal glass and crystalline metal.

When, as shown in FIG. 16, the metal glass (BMG) 11 and the crystalline metal plate 12 were subjected to butt welding by application of an electron beam, the scanning line 13 of the electron beam was shifted from a butt surface 14 to the side of the metal glass 11, and the amount of shift was set within a range of 0 to 400 µm. Thus, the metal glass 11 was heated to form a molten layer 15, and the metal glass 11 and the crystalline metal plate 12 were joined.

(Welding Conditions)

The application of the electron beam was set such that an acceleration voltage was 60 kV, a beam current value was 6 mA, a welding speed (the speed of scanning of the electron beam) was 66 mm/s and the amount of heat discharged into welding was 18 j/mm.

(Joint Evaluation Method)

As the joint evaluation method of evaluating the result of the joining, effects on mechanical properties of the joint portion through the application time were evaluated by performing the three-point bending test. The results thereof are shown in Table 2.

The present invention is not limited to the embodiment and the examples described above, and many modifications are possible without departing from the spirit of the present invention.

DESCRIPTION OF SYMBOLS 1 and 11 Metal glass
2 and 12 Crystalline metal
3 Interface where the metal glass and the crystalline metal make contact with each other
4 and 15 Molten layer (bead)
5 Electron beam
6 Relationship between an irradiation time and a spread factor when the crystalline metal is Cu
7 Relationship between an irradiation time and a spread factor when the crystalline metal is Al
10 A portion holding and joining the metal glass and the crystalline metal
13 Scanning line of an electron beam
14 Butt surface

The invention claimed is:

1. A design method of a welding method of welding a metal glass formed with a nano crystalline metal or an amorphous metal and a crystalline metal having a crystalline structure,
wherein said welding method includes: applying energy to an interface where said metal glass and said crystalline metal make contact with each other or to said metal glass near the interface; heating and melting said metal glass to form a molten layer; and joining said metal glass to said crystalline metal, and said molten layer after said metal glass and said crystalline metal have been joined together has a glass formation ability, and
wherein said design method designs a welding method by selecting a metal glass and a crystalline metal such that said metal glass has a glass formation ability in which a nose time of a TTT curve when a solid of said metal glass is reheated is 0.2 seconds or more, and said metal glass and crystalline metal satisfy a temperature range of a temperature of said metal glass at which a spread factor of said crystalline metal that has not been melted and said molten metal glass is 25% or more and a melting point of said crystalline metal to be 100 K or more, and
wherein, in said welding method, a maximum temperature of said interface heated at the time of welding is 95% or less of the melting point of said crystalline metal.

2. The design method of a welding method according to claim 1, wherein a welding method is designed by selecting a metal glass and a crystalline metal that satisfy a temperature range of a temperature of said metal glass at which said spread factor in said design method is 25% or more and the melting point of said crystalline metal to be 450 K or more.

3. The design method of a welding method according to claim 1, wherein a welding method is designed by selecting a metal glass and a crystalline metal that satisfy a temperature range of a temperature of said metal glass at which said spread factor in said design method is 25% or more and the melting point of said crystalline metal to be 800 K or more.

4. A design method of a welding method of welding a metal glass formed with a nano crystalline metal or an amorphous metal and a crystalline metal having a crystalline structure,
wherein said welding method includes: applying energy to an interface where said metal glass and said crystalline metal make contact with each other or to said metal glass near the interface; heating and melting said metal glass to form a molten layer; and joining said metal glass to said crystalline metal, and said molten layer after said metal glass and said crystalline metal have been joined together has a glass formation ability, and
wherein said design method designs a welding method by selecting a metal glass and a crystalline metal such that said metal glass has a glass formation ability in which a nose time of a TTT curve when a solid of said metal glass is reheated is 0.2 seconds or more, and said metal glass and crystalline metal satisfy a temperature range of a temperature of said metal glass at which a spread factor of said crystalline metal that has not been melted and said molten metal glass is 25% or more and a melting point of said crystalline metal to be 9.7% or more of a melting point of said metal glass, and
wherein, in said welding method, a maximum temperature of said interface heated at the time of welding is 95% or less of the melting point of said crystalline metal.

5. The design method of a welding method according to claim 1, wherein said molten layer after said metal glass and said crystalline metal have been joined together makes contact with said interface and has a protrusion positioned on a side of said metal glass of said interface.

6. The design method of a welding method according to claim 4, wherein said molten layer after said metal glass and said crystalline metal have been joined together makes contact with said interface and has a protrusion positioned on a side of said metal glass of said interface.

* * * * *